United States Patent
Odinokikh et al.

(10) Patent No.: US 11,449,590 B2
(45) Date of Patent: Sep. 20, 2022

(54) DEVICE AND METHOD FOR USER AUTHENTICATION ON BASIS OF IRIS RECOGNITION

(71) Applicant: Samsung Electronics Co., Ltd., Suwon-si (KR)

(72) Inventors: Gleb Andreevich Odinokikh, Moscow (RU); Aleksei Mikhailovich Fartukov, Moscow (RU); Vitaly Sergeevich Gnatyuk, Moscow (RU); Vladimir Alekseevich Eremeev, Moscow (RU); Juwoan Yoo, Suwon-si (KR); Kwanghyun Lee, Suwon-si (KR); Heejun Lee, Suwon-si (KR); Daekyu Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 205 days.

(21) Appl. No.: 16/765,298

(22) PCT Filed: Nov. 23, 2018

(86) PCT No.: PCT/KR2018/014515
§ 371 (c)(1),
(2) Date: May 19, 2020

(87) PCT Pub. No.: WO2019/103520
PCT Pub. Date: May 31, 2019

(65) Prior Publication Data
US 2020/0356648 A1 Nov. 12, 2020

(30) Foreign Application Priority Data

Nov. 24, 2017 (RU) .......................... RU2017141021
Nov. 12, 2018 (KR) ........................ 10-2018-0138307

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/45* (2013.01); *G06K 9/6215* (2013.01); *G06V 40/19* (2022.01); *G06V 40/193* (2022.01); *G06V 40/197* (2022.01)

(58) Field of Classification Search
CPC ....... G06F 21/32; G06F 21/45; G06K 9/6215; G06V 40/19; G06V 40/193; G06V 40/197; G06V 40/18; G06V 40/171; G06T 7/0016
See application file for complete search history.

(56) References Cited

U.S. PATENT DOCUMENTS

| 5,291,560 A | 3/1994 | Daugman |
| 7,697,735 B2 | 4/2010 | Adam et al. |

(Continued)

FOREIGN PATENT DOCUMENTS

| CN | 101034434 A | 9/2007 |
| EP | 0 664 037 A1 | 4/1994 |

(Continued)

OTHER PUBLICATIONS

International Search Report and written opinion dated Mar. 13, 2019, issued in an International Application No. PCT/KR2018/014515.

(Continued)

*Primary Examiner* — Jeffrey C Pwu
*Assistant Examiner* — William A Corum, Jr.
(74) *Attorney, Agent, or Firm* — Jefferson IP Law, LLP (57) ABSTRACT

Provided are a user authentication device and method based on iris recognition. The user authentication method includes:
(Continued)

acquiring an image of a user's left and right eyes; extracting a pupil image and an iris image from the image; obtaining a first iris feature by analyzing the iris image; obtaining a second iris feature by analyzing the iris image and the pupil image; obtaining a similarity score based on the first iris feature, the second iris feature, and prestored reference iris data; and determining whether to approve user authentication based on the similarity score.

18 Claims, 8 Drawing Sheets

(51) Int. Cl.
  *G06F 21/45* (2013.01)
  *G06K 9/62* (2022.01)
  *G06V 40/19* (2022.01)
  *G06V 40/18* (2022.01)

(56) References Cited

U.S. PATENT DOCUMENTS

| | | | |
|---|---|---|---|
| 8,050,463 | B2 | 11/2011 | Hamza |
| 8,170,295 | B2 | 5/2012 | Fujii et al. |
| 8,317,325 | B2 | 11/2012 | Raguin et al. |
| 8,433,105 | B2 | 4/2013 | Choi et al. |
| 9,064,145 | B2 | 6/2015 | Tan et al. |
| 9,183,440 | B2 | 11/2015 | Bohne |
| 9,282,237 | B2 | 3/2016 | Tamer |
| 9,530,052 | B1 * | 12/2016 | Pillai ............ G06V 40/197 |
| 2008/0253622 | A1 | 10/2008 | Tosa et al. |
| 2010/0110374 | A1 | 5/2010 | Raguin et al. |
| 2016/0012275 | A1 | 1/2016 | Bergen |
| 2018/0276467 | A1 * | 9/2018 | Kaehler ............ G02B 27/017 |

FOREIGN PATENT DOCUMENTS

| | | |
|---|---|---|
| EP | 01 991 948 | 6/2010 |
| EP | 02 754 088 | 7/2014 |
| KR | 10-2008-0017763 | 2/2008 |
| KR | 10-2009-0074185 A | 7/2009 |
| KR | 10-2013-0011913 | 9/2013 |
| KR | 10-1763761 | 8/2017 |
| RU | 110848 U1 | 11/2011 |
| RU | 2628201 C1 | 8/2017 |
| RU | 2630742 C1 | 9/2017 |
| WO | 94/09446 A1 | 4/1994 |
| WO | 2008/016724 A2 | 2/2008 |
| WO | 2013/034654 A1 | 3/2013 |

OTHER PUBLICATIONS

Russian Office Action dated Sep. 5, 2018, issued in a counterpart Russian Application No. 2017141021.

Russian Decision on Grant dated Aug. 28, 2018, issued in a counterpart Russian Application No. 2017141021.

Iftakhar, Hasan et al., "Dual Iris Based Human Identification", Dhaka, Bangladesh Dec. 22-24, 2011.

Thomas, Vince et al., "Learning to predict gender from iris images", Crystal City, VA, USA Sep. 27-29, 2007.

European Search Report dated Nov. 9, 2020, in European Application No. No18880306.8.

* cited by examiner

DEVICE AND METHOD FOR USER AUTHENTICATION ON BASIS OF IRIS RECOGNITION

TECHNICAL FIELD

The present disclosure relates to an iris recognition-based user authentication device and method, and more particularly, to a device and method for determining whether to approve user authentication by recognizing irises of users including a user whose iris is partly occluded.

BACKGROUND ART

Technology related to user identification using biometric recognition is one of the rapidly growing technical fields, and in particular, recognizing and identifying an eye, i.e., an iris, among a user's body parts, is one of the most effective methods of user authentication.

However, according to a traditional iris recognition method, a sufficient area (e. g., more than 40%) of an iris needs to be registered to obtain a reliable recognition result, and an iris region should not be occluded by the user's eyelid and eyelashes or by highlights due to the user wearing eyeglasses.

Thus, a user is required to open his or her eyes wide during iris registration and recognition to obtain a reliable level of authentication, even in various external environments. These various external environments may be bright light that is reflected directly or indirectly from other objects, such as snow, wind, dust, fog, smoke, etc., or may be diseases, such as drooping eyelid, which make it difficult to open the eyes wide.

Figure 1:
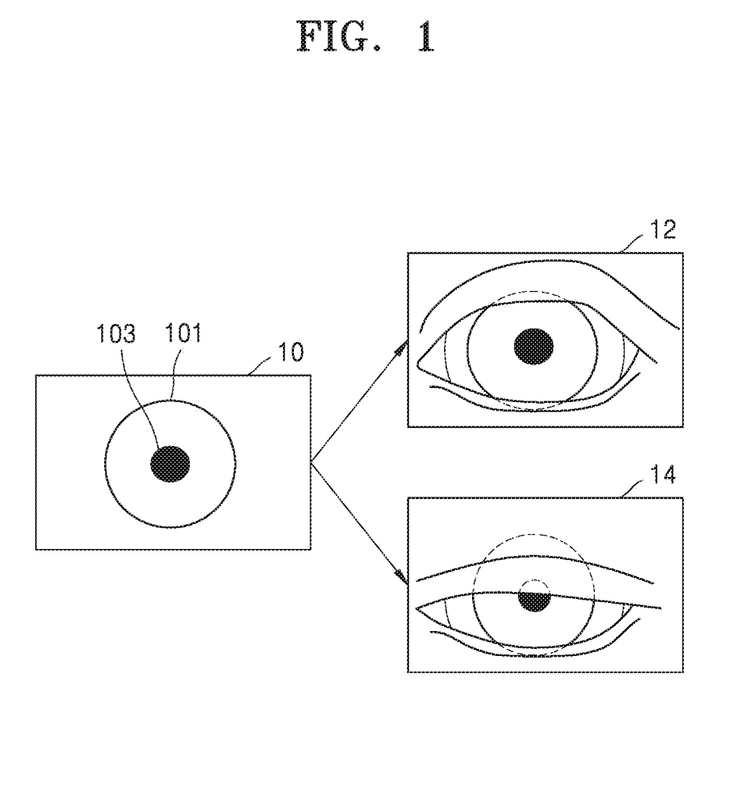
FIG. 1 illustrates an iris region and a pupil region in an image of a user's eye, according to some embodiments.

FIG. 1 illustrates an iris region and a pupil region in an image of a user's eye, according to some embodiments.

Referring to FIG. 1, an image 10 of a user's eye may be largely divided into an iris region 101 and a pupil region 103. A traditional iris recognition technique mainly involves extracting iris features, i.e., features of an iris texture, via image analysis of the iris region 101 and comparing the extracted iris features with pre-registered iris data to check whether they match each other. In this case, a texture refers to an image patch or pattern characterized by statistical indicators describing characteristics of image pattern orientations and spatial frequency.

Because a user's iris has its corresponding unique texture, each user may pre-register and manage iris data by capturing and analyzing an image of his or her own iris and use the iris data as a user authentication tool.

Referring back to FIG. 1, when the user has his or her eye wide open (12), the pupil region 103 is not covered by the user's eyelid while the iris region 101 is partially obscured by the user's eyelid, but a sufficient area for registration and recognition is exposed.

On the other hand, when the user narrows his or her eye (14), the pupil region 103 and the iris region 101 are partially covered by the user's eyelid, and in particular, a sufficient area of the iris region 101 for registration and recognition is not exposed, which may cause difficulties in iris recognition and user authentication.

One of the biometric systems based on traditional iris recognition uses a method of modifying a similarity score calculation by determining a confidence score based on local densities of similarities between compared iris images, and determining whether the compared iris images match each other based on a result of the modification.

However, according to this method, only information about binary iris representation is used, and no additional parameter for determining the confidence score is used. In other words, because only parameters related to iris texture (i.e., binary iris representation) and information about an iris of one eye are used during iris recognition, this method is not suitable as a solution to the problem related to recognition of a partially occluded eye.

Another of the biometric systems using traditional iris recognition is a recognition method in which multiple features of a user's eye image are fused. The multiple features include both information about parameters related to iris texture and additional information about eye color and a region around an eye.

The method employing such additional information is used to improve recognition accuracy, thereby reducing the number of failed recognition attempts, but this method requires the use of additional computational resources due to the use of additional information and uses only information about one eye. Thus, this method is not adequate for providing a solution to the problem related to recognition of a partially occluded eye.

Moreover, another of the biometric systems based on traditional iris recognition uses a combination of fingerprint recognition and facial recognition to improve recognition accuracy. According to this method, during facial recognition, left and right eye iris images may be rotated at an angle in a direction such that a head tilt angle is removed, by using a virtual line extending between a user's two eyes according to predefined features associated with the eyes. An iris image generated as a result of the rotation may be used for registration or authentication, and the head tilt angle may be determined using a predefined feature associated with one eye in an image.

According to the method, a single unified similarity score is generated based on iris similarity scores of the two eyes, which are used for user identification, but iris-related parameters are not used to generate the unified similarity score. In other words, geometric parameters such as interpupillary distance (IPD) and an IPD-to-iris ratio may be used to estimate the quality of iris images for further recognition or fast retrieval of an appropriate template from a database in which the geometric parameters are prestored, but not to calculate the unified similarity score.

Thus, this method is also not adequate for providing a solution to the problem related to recognition of a partially occluded eye.

DESCRIPTION OF EMBODIMENTS

Technical Problem

Provided are iris recognition-based user authentication device and method capable of increasing accuracy of iris recognition via analysis of the iris and pupil of a user's left and right eyes.

Also provided are iris recognition-based user authentication device and method capable of effectively performing iris recognition by using information about geometric parameters of an iris obtained via analysis of a user's iris image and pupil image.

Solution to Problem

As a technical solution to the above problems, according to an aspect of the present disclosure, a method of authenticating a user based on iris recognition includes: acquiring an image of a user's left and right eyes; extracting a pupil image and an iris image from the image; obtaining a first iris feature by analyzing the iris image; obtaining a second iris feature by analyzing the iris image and the pupil image; obtaining a similarity score based on the first iris feature, the second iris feature, and prestored reference iris data; and determining whether to approve user authentication based on the similarity score.

According to another aspect of the present disclosure, a device for authenticating a user based on iris recognition includes: at least one processor configured to acquire an image of a user's left and right eyes, extract a pupil image and an iris image from the image, obtain a first iris feature by analyzing the iris image, obtain a second iris feature by analyzing the iris image and the pupil image, obtain a similarity score based on the first iris feature, the second iris feature, and prestored reference iris data, and determine whether to approve user authentication based on the similarity score; and at least one memory storing the reference iris data.

According to another aspect of the present disclosure, a computer program apparatus includes a computer-readable recording medium having recorded thereon a program for executing on a computer the method according to the aspect of the present disclosure.

Advantageous Effects of Disclosure

According to some embodiments, accuracy of iris recognition may be increased via analysis of an iris and a pupil of a user's left and right eyes.

Furthermore, according to some embodiments, it is possible to efficiently perform iris recognition by using information about geometric parameters of an iris obtained via analysis of a user's iris image and pupil image.

BEST MODE

According to an embodiment of the present disclosure, a method of authenticating a user based on iris recognition includes: acquiring an image of a user's left and right eyes; extracting a pupil image and an iris image from the image; obtaining a first iris feature by analyzing the iris image; obtaining a second iris feature by analyzing the iris image and the pupil image; obtaining a similarity score based on the first iris feature, the second iris feature, and prestored reference iris data; and determining whether to approve user authentication based on the similarity score.

According to another embodiment of the present disclosure, a device for authenticating a user based on iris recognition includes: at least one processor configured to acquire an image of a user's left and right eyes, extract a pupil image and an iris image from the image, obtain a first iris feature by analyzing the iris image, obtain a second iris feature by analyzing the iris image and the pupil image, obtain a similarity score based on the first iris feature, the second iris feature, and prestored reference iris data, and determine whether to approve user authentication based on the similarity score; and at least one memory storing the reference iris data.

According to another embodiment of the present disclosure, a computer program apparatus includes a computer-readable recording medium having recorded thereon a program for executing on a computer the method according to the embodiment.

MODE OF DISCLOSURE

The foregoing objectives, features and advantages will be described in detail below with reference to the accompanying drawings so that one of ordinary skill in the art may easily implement the technical ideas of the present disclosure. In the following description of the present disclosure, known techniques related to the disclosure are not described in detail because they would obscure the essence of the disclosure with unnecessary detail. Hereinafter, exemplary embodiments of the present disclosure will be described more fully with reference to the accompanying drawings. In the drawings, the same reference numerals denote the same or similar elements throughout.

Throughout the specification, it will be understood that when a part is referred to as being "connected" or "coupled" to another part, it can be directly connected to or electrically coupled to the other part with one or more intervening elements interposed therebetween. Furthermore, when a part "includes" or "comprises" an element, unless there is a particular description contrary thereto, the part can further include other elements, not excluding the other elements.

The present disclosure will now be described in more detail with reference to the accompanying drawings.

Figure 2:
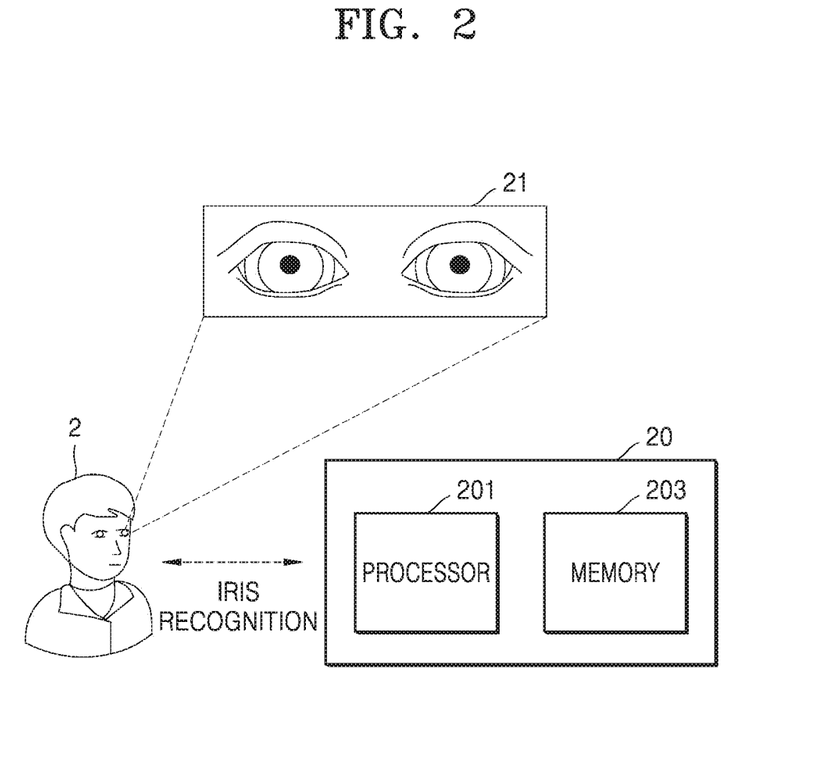
FIG. 2 illustrates an example of an iris recognition-based user authentication device according to some embodiments.

FIG. 2 illustrates an example of an iris recognition-based user authentication device according to some embodiments.

Referring to FIG. 2, the iris recognition-based user authentication device 20 may perform user authentication by acquiring an image 21 of left and right eyes of a user 2.

According to some embodiment, the iris-recognition-based user authentication device 20 may include a processor 201 and a memory 203.

The processor 201 may acquire the image 21 of the user's left and right eyes.

For example, the processor 201 may acquire the image 21 of the user's left and right eyes by capturing a user's image directly via an image acquisition unit, or may receive from another device the image 21 of the user's left and right eyes captured by the other device.

The processor 201 may extract a pupil image and an iris image from the image 21 of the user's left and right eyes.

For example, the processor 201 may segment and acquire a pupil image and an iris image of the left eye and a pupil image and an iris image of the right eye from the image 21 of the user's left and right eyes.

The processor 201 may obtain a first iris feature by analyzing the iris image. For example, the processor 201 may obtain the first iris feature by performing iris segmentation and normalization.

The first iris feature may include information about an iris texture feature. For example, the first iris feature may include information about an iris texture extracted by analyzing an iris image acquired from the image 21 of the user's left and right eyes. The first iris feature may be encoded into, for example, a binary iris code.

The processor 201 may obtain a second iris feature by analyzing the iris image and the pupil image.

The second iris feature may include information about geometric parameters for the user's pupil position and iris position. For example, the second iris feature may include information about radius $R_I$ of an iris circle, a ratio PIR between a radius of a pupil circle and the radius of the iris circle, a normalized X-axis distance NDX, and a normalized Y-axis distance NDY.

Here, the iris circle means a circumscribed circle having the smallest radius among circles circumscribed about the iris, and the pupil circle means a circumscribed circle having the smallest radius among circles circumscribed about the pupil.

The processor 201 may obtain the second iris feature based on center coordinates $(X_I, Y_I)$ and the radius $R_I$ of the iris circle, which are determined by analyzing the iris image, and on center coordinates $(X_P, Y_P)$ and a radius $R_P$ of the pupil circle, which are determined by analyzing the pupil image.

The processor 201 may obtain a similarity score based on the first iris feature, the second iris feature, and reference iris data pre stored in the memory 203.

The processor 201 may generate a first similarity parameter by comparing an iris code corresponding to the first iris feature with a reference code included in the reference iris data prestored in the memory 203.

In addition, the processor 201 may generate a second similarity parameter by comparing the second iris feature with a reference feature included in the reference iris data prestored in the memory 203.

The processor 201 may obtain a similarity score by using the first and second similarity parameters. For example, the processor 201 may substitute the first and second similarity parameters into at least one of a preset equation and a parameter mapping table to obtain a similarity score for determining whether to approve user authentication.

The processor 201 may determine whether to approve user authentication based on the similarity score. For example, the processor 201 may determine whether to approve user authentication by comparing the obtained similarity score with a preset threshold score.

Figure 3:
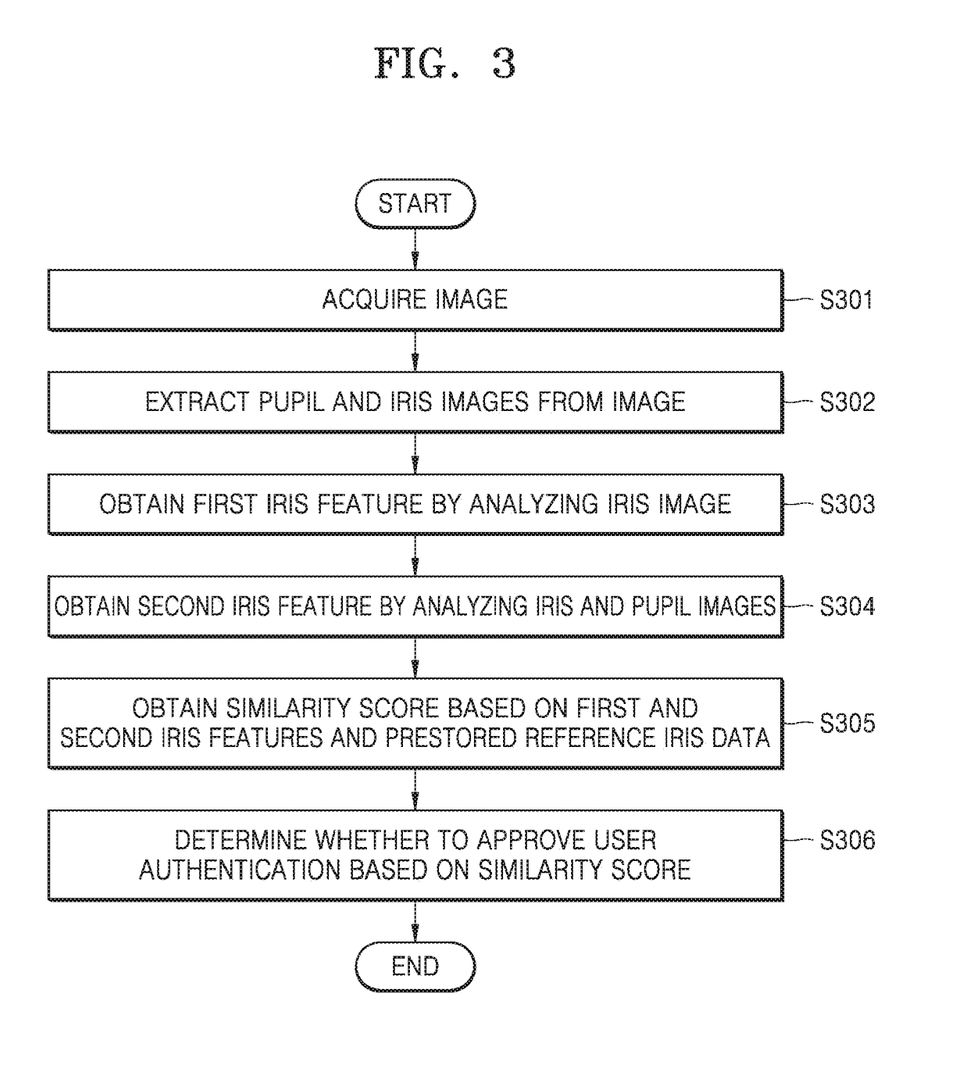
FIG. 3 is a flowchart of an iris recognition-based user authentication method according to some embodiments of the present disclosure.

FIG. 3 is a flowchart of an iris recognition-based user authentication method according to some embodiments of the present disclosure.

In operation S301, the processor 201 may acquire an image of a user's left and right eyes. For example, the processor 201 may acquire the image of the user's left and right eyes by capturing a user's image directly via an image acquisition unit, or may receive from another device the image of the user's left and right eyes captured by the other device.

In operation S302, the processor 201 may extract a pupil image and an iris image from the acquired image. For example, the processor 201 may segment and acquire a pupil image and an iris image of the left eye and a pupil image and an iris image of the right eye from the image of the user's left and right eyes.

A detailed method of extracting a pupil image and an iris image by the processor 201 will be described below with reference to an embodiment of FIG. 4.

In operation S303, the processor 201 may obtain a first iris feature by analyzing the iris image. For example, the processor 201 may obtain the first iris feature by performing iris segmentation and normalization. The first iris feature may include information about an iris texture feature. For example, the first iris feature may be encoded into, for example, a binary iris code.

In operation S304, the processor 201 may obtain a second iris feature by analyzing the iris image and the pupil image. The second iris feature may include information about geometric parameters for the user's pupil position and iris position. For example, the second iris feature may include information about a radius $R_I$ of an iris circle, a ratio PIR between a radius of a pupil circle and the radius of the iris circle, a normalized X-axis distance NDX, and a normalized Y-axis distance NDY.

The processor 201 may obtain the second iris feature based on center coordinates $(X_I, Y_I)$ and the radius $R_I$ of the iris circle, which are determined by analyzing the iris image, and on center coordinates $(X_P, Y_P)$ and a radius $R_P$ of the pupil circle, which are determined by analyzing the pupil image.

In operation S305, the processor 201 may obtain a similarity score based on the first iris feature, the second iris feature, and prestored reference iris data.

The processor 201 may generate a first similarity parameter by comparing an iris code corresponding to the first iris feature with a reference code included in the reference iris data prestored in the memory 203.

The processor 201 may generate the first similarity parameter based on a normalized Hamming distance $HD_{Left}$ for the left eye, a normalized Hamming distance $HD_{Right}$ for the right eye, the number of bits $BitCount_{Left}$ for the left eye, and the number of bits $BitCount_{Right}$ for the right eye.

The processor 201 may calculate the normalized Hamming distances $HD_{Left}$ and $HD_{Right}$ for the left and right eyes, e.g., by comparing an iris code with a prestored reference code in order to generate the first similarity parameter.

A Hamming distance (or HD) is a distance function that indicates how many different symbols are in the same position in two strings of an equal length, and in particular, the Hamming distance between binary codes represent the number of mismatching bits between binary codes to be compared.

For example, while calculating the normalized Hamming distances $HD_{Left}$ and $HD_{Right}$ for the left and right eyes, the processor 201 may determine the number of bits $BitCount_{Left}$ for the left eye, which are used to calculate the normalized Hamming distance $HD_{Left}$ for the left eye, and the number of bits $BitCount_{Right}$ for the right eye, which are used to calculate the normalized Hamming distance $HD_{Right}$ for the right eye. Each number of bits corresponds to the number of bits in a region where masking due to the user's eyelid does not exist during iris recognition, i.e., the number of bits in an exposed region.

For example, the first similarity parameter may include a Hamming distance difference parameter $\Delta HD_{norm}$ that indicates a normalized difference between the normalized Hamming distances $HD_{Left}$ and $HD_{right}$ for the left and right eyes.

The first similarity parameter may include, for example, a Hamming distance average parameter $HD_{avg}$ that indicates an average of the normalized Hamming distances $HD_{Left}$ and $HD_{right}$ for the left and right eyes.

The first similarity parameter may include, for example, a minimum total bit number parameter $BitCount_{min}$ which indicates a minimum total number of bits used to calculate the normalized Hamming distances $HD_{left}$ and $HD_{right}$ for the left and right eyes.

The first similarity parameter may include, for example, a maximum total bit number parameter $BitCount_{max}$ which indicates a maximum total number of bits used to calculate the normalized Hamming distances $HD_{left}$ and $HD_{right}$ for the left and right eyes.

In addition, the processor 201 may generate a second similarity parameter by comparing the second iris feature with a reference feature included in the reference iris data prestored in the memory 203.

The processor 201 may generate a second similarity parameter based on the radius $R_I$ of the iris circle for the left and right eyes, a ratio PIR between the radius of the pupil circle and the radius of the iris circle for the left and right eyes, a normalized X-axis distance NDX for the left and right eyes, and a normalized Y-axis distance NDY for the left and right eyes.

For example, the second similarity parameter may include a minimum center distance difference parameter $\Delta ND_{min}$ which indicates a minimum distance between centers of the pupil circle and the iris circle.

The second similarity parameter may include, for example, a maximum center distance difference parameter $\Delta ND_{max}$ which indicates a maximum distance between the centers of the pupil circle and the iris circle.

The second similarity parameter may include, for example, a radius difference average parameter $\Delta R_{I,avg}$ which indicates an average of a normalized left eye iris circle radius difference and a normalized right eye iris circle radius difference.

The second similarity parameter may include, for example, a radius ratio difference average parameter $\Delta PIR_{avg}$ that indicates an average of a difference between ratios of a pupil circle radius to an iris circle radius of a left eye and a difference between ratios of a pupil circle radius to an iris circle radius of a right eye.

The processor 201 may obtain a similarity score by using the first and second similarity parameters.

For example, the processor 201 may obtain a similarity score by using the first similarity parameter including a plurality of parameters, such as a Hamming distance difference parameter $\Delta HDnorm$, a Hamming distance average parameter $HD_{avg}$, a minimum total bit number parameter $BitCount_{min}$ and a maximum total bit number parameter $BitCount_{max}$, and the second similarity parameter including a plurality of parameters, such as a minimum center distance difference parameter $\Delta ND_{min}$, a maximum center distance difference parameter $\Delta ND_{max}$, a radius difference average parameter $\Delta R_{I,avg}$, and a radius ratio difference average parameter $\Delta PIR_{avg}$.

A detailed method of obtaining, by the processor 201, a similarity score by using first and second similarity parameters will be described below with reference to an embodiment of FIG. 8.

In operation S306, the processor 201 may determine whether to approve user authentication based on the similarity score. For example, the processor 201 may determine whether to approve user authentication by comparing the obtained similarity score with a preset threshold sore.

A detailed method of determining, by the processor 201, whether to approve user authentication based on a similarity score will be described below with reference to an embodiment of FIG. 9.

Figure 4:
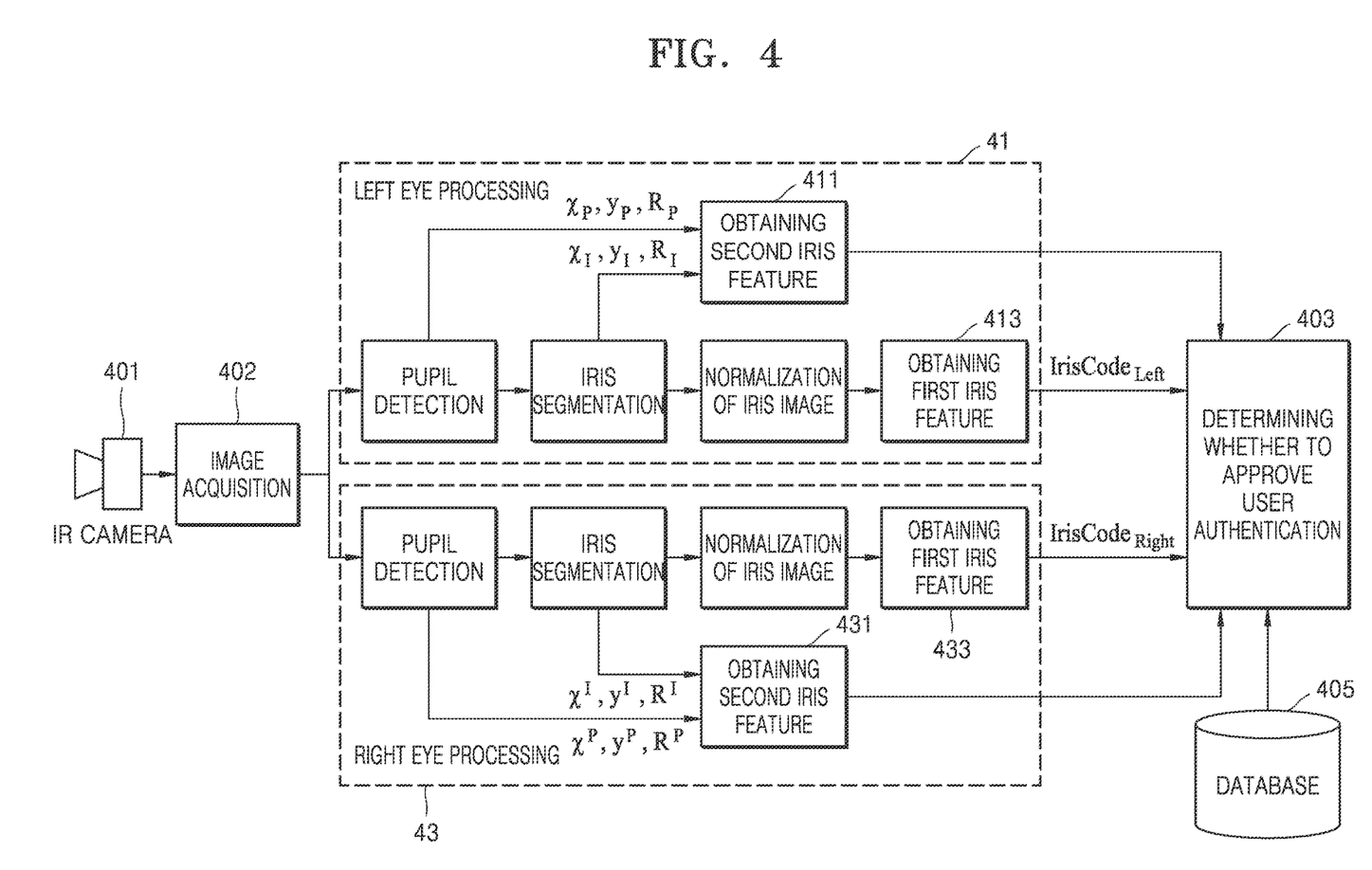
FIG. 4 illustrates a method of obtaining a first iris feature and a second iris feature, according to some embodiments of the present disclosure.

FIG. 4 illustrates a method of obtaining a first iris feature and a second iris feature, according to some embodiments of the present disclosure.

For reference, in a method of displaying a parameter according to the present disclosure, the superscript "Enrolled" represents a parameter obtained from prestored reference iris data, and the superscript "Probe" represents a parameter obtained from an image of a user's left and right eyes during authentication. Furthermore, the subscript "Left" indicates a parameter obtained for the left eye, and the subscript "Right" indicates a parameter obtained for the right eye.

For example, the processor 201 may receive a user's image captured via an external device such as an infrared (IR) camera 401 and acquire an image of the user's left and right eyes from the received user's image (402).

After acquiring the image of the user's left and right eyes, the processor 201 may separate the left and right eye regions in the image from each other to separately obtain first and second iris features of the left and right eyes (41 and 43).

In the process 41 of obtaining features of the left eye region, the processor 201 may perform a plurality of operations as follows.

For example, the processor 201 may detect a left eye pupil in the image and determine a radius and center coordinates of a circle representing the detected left eye pupil. The processor 201 may acquire a left eye pupil image via detection of the left eye pupil.

When the radius and the center coordinates of the left eye pupil circle are determined, the processor 201 may perform segmentation of a left eye iris. The segmentation of the left eye iris may include determining a boundary between the left eye pupil and the left eye iris. For example, the segmentation of the left eye iris may be performed using an image segmentation algorithm.

The processor 201 may acquire a left eye iris image via the segmentation of the left eye iris and determine a radius and center coordinates of a circle representing the left eye iris.

After the segmentation of the left eye iris, the processor 201 may normalize the left eye iris image. Normalization of the left eye iris image may be defined as transformation of a pixel in the left eye iris image from polar coordinates into linear coordinates, and pixels in the left eye iris image may be moved from circular locations to rectangular matrix locations through the normalization.

The processor 201 may extract a first left iris feature from the normalized left eye iris image (413). The processor 201 may generate a binary left iris code by encoding the extracted first left iris feature.

Moreover, the processor 201 may obtain a second left iris feature based on information about the left eye pupil image acquired during detection of the left eye pupil and information about the left eye iris image acquired during segmentation of the left eye iris (411).

For example, the processor 201 may obtain the second left iris feature based on center coordinates $(X_{I,Left}, Y_{I,Left})$ and a radius $R_{I,Left}$ of the left eye iris circle, which are determined by analyzing the left eye iris image, and on center coordinates $(X_{P,Left}, Y_{P,Left})$ and a radius $R_P$ of the left eye pupil circle, which are determined by analyzing the left eye pupil image (411).

For example, the second left iris feature may include information about pupil and iris positions, such as the radius $R_{I,Left}$ of the left eye iris circle, a ratio $PIR_{Left}$ between a radius of the left eye pupil circle and the radius of the left eye iris circle, a normalized X-axis distance $NDX_{Left}$ for the left eye and a normalized Y-axis distance $NDY_{Left}$ for the right eye.

Similarly, right eye image processing includes operations corresponding to those for left eye image processing. In the process 43 of processing the right eye region, the processor 201 may perform a plurality of operations as follows.

For example, the processor 201 may detect a right eye pupil in the image and determine a radius and center coordinates of a circle representing the detected right eye pupil. The processor 201 may acquire a right eye pupil image via detection of the right eye pupil.

When the radius and the center coordinates of the right eye pupil circle are determined, the processor 201 may perform segmentation of a right eye iris. The segmentation of the right eye iris may include determining a boundary between the right eye pupil and the right eye iris. For example, the segmentation of the right eye iris may be performed using an image segmentation algorithm.

The processor 201 may acquire a right eye iris image via the segmentation of the right eye iris and determine a radius and center coordinates of a circle representing the right eye iris.

After the segmentation of the right eye iris, the processor 201 may normalize the right eye iris image. Normalization of the right eye iris image may be defined as transformation of a pixel in the right eye iris image from polar coordinates into linear coordinates, and pixels in the right eye iris image may be moved from circular locations to rectangular matrix locations through the normalization.

The processor 201 may extract a first right iris feature from the normalized right eye iris image (433). The processor 201 may generate a binary right iris code by encoding the extracted first right iris feature.

Moreover, the processor 201 may obtain a second right iris feature based on information about the right eye pupil image acquired during detection of the right eye pupil and information about the right eye iris image acquired during segmentation of the right eye iris (431).

For example, the processor 201 may obtain the second right iris feature based on center coordinates $(X_{I,Right}, Y_{I,Right})$ and a radius $R_{I,Right}$ of the right eye iris circle, which are determined by analyzing the right eye iris image, and on center coordinates $(X_{P,Right}, Y_{P,Right})$ and a radius $R_{P,Right}$ of the right eye pupil circle, which are determined by analyzing the right eye pupil image 431.

For example, the second right iris feature may include information about pupil and iris positions, such as the radius $R_{I,Right}$ of the right eye iris circle, a ratio $PIR_{Right}$ between a radius of the right eye pupil circle and the radius of the right eye iris circle, a normalized X-axis distance $NDX_{Right}$ for the right eye, and a normalized Y-axis distance $NDY_{Right}$ for the right eye.

A method of obtaining information about geometric parameters of pupils and irises of the left and right eyes will be described later with reference to FIG. 5.

The processor 201 may determine whether to approve user authentication by comparing the first iris features and the second iris features obtained for the left and right eyes with reference iris data in a database 405 stored in the memory 203 403.

Figure 5:
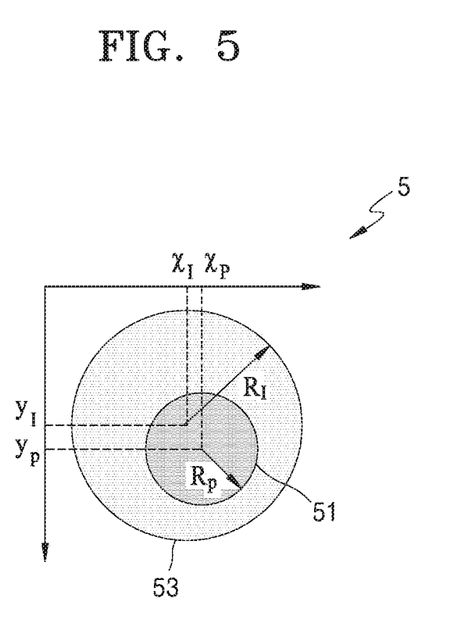
FIG. 5 is a diagram illustrating positions of a pupil and an iris in a coordinate system according to some embodiments.

FIG. 5 is a diagram illustrating positions of a pupil and an iris in a coordinate system according to some embodiments.

FIG. 5 shows the positions of the pupil and iris in the coordinate system having X and Y axes and parameters corresponding to each position. In general, because centers of the user's iris and pupil do not coincide, the processor 201 may generate parameters by using circumscribed circles, i.e., an iris circle 53 and a pupil circle 51, by which the iris and the pupil are respectively approximated.

The pupil circle 51 circumscribed about the pupil has a radius $R_P$ and center coordinates $(X_P, Y_P)$, and the iris circle 53 circumscribed about the iris has a radius $R_I$ and center coordinates $(X_I, Y_I)$. Each parameter for the pupil circle 51 and the iris circle 53 may be used to generate a second iris feature, i.e., a plurality of parameters such as the radius $R_I$ of the iris circle 53, a ratio PIR between the radius of the pupil circle and the radius $R_I$ of the iris circle, a normalized X-axis distance NDX, and a normalized Y-axis distance NDY. The second iris feature may be compared to a reference feature included in prestored reference iris data and used to generate a second similarity parameter.

In this way, the second iris feature is calculated based on information about sizes and positions of the pupil and iris, which are determined while obtaining a first iris feature and an iris code, and because a formula for the second iris feature is computationally simple, it does not require a large amount of computational recourses for processing data.

Figure 6:
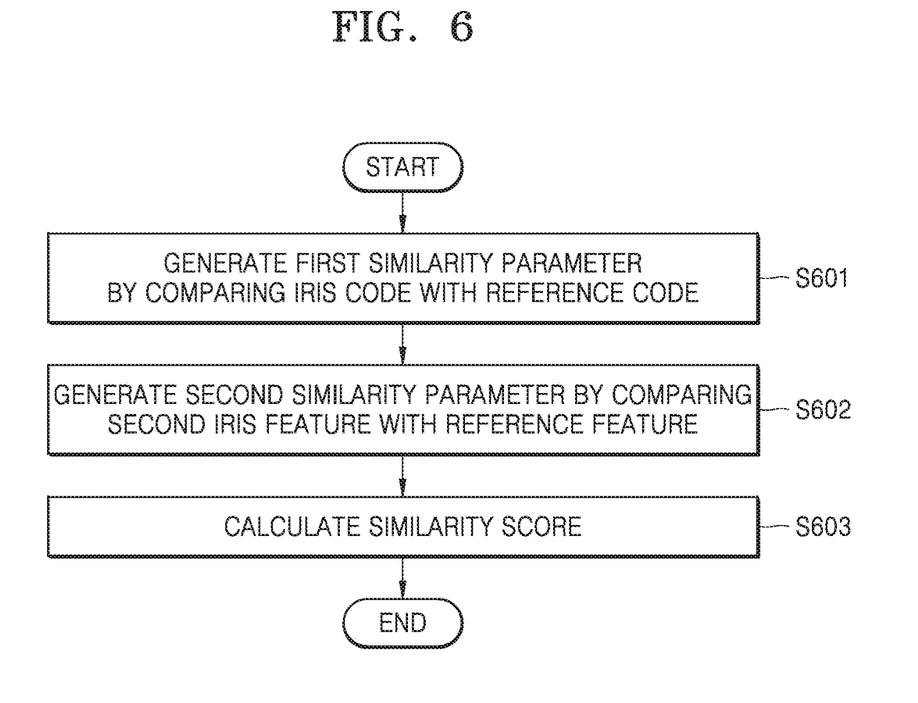
FIG. 6 is a flowchart of a method of calculating a similarity score, according to some embodiments.

FIG. 6 is a flowchart of a method of calculating a similarity score, according to some embodiments.

In operation S601, the processor 201 may generate a first similarity parameter by comparing an iris code corresponding to the first iris feature with a reference code included in prestored reference iris data. Details of the method used to generate the first similarity parameter in operation S601 will be described below based on an embodiment of FIG. 7.

In operation S602, the processor 201 may generate a second similarity parameter by comparing a second iris feature with a reference feature included in the prestored reference iris data.

The processor 201 may obtain the second right iris feature based on center coordinates $(X_I, Y_I)$ and a radius $R_I$ of an iris circle, which are determined by analyzing an iris image, and on center coordinates $(X_P, Y_P)$ and a radius $R_P$ of a pupil circle, which are determined by analyzing a pupil image.

The second iris feature obtained via analysis of left eye iris and pupil images by the processor 201 may include, for example, information about a normalized X-axis distance $NDX_{Left}$ for the left eye, a normalized Y-axis distance $NDY_{Left}$ for the left eye, a left eye circle radius ratio $PIR_{Left}$, and a left eye iris circle radius $R_{I,Left}$.

Furthermore, the second iris feature obtained via analysis of right eye iris and pupil images by the processor 201 may include, for example, a normalized X-axis distance $NDX_{Right}$ for the right eye, a normalized Y-axis distance $NDY_{Right}$ for the right eye, a right eye circle radius ratio $PIR_{Right}$, and a right eye iris circle radius $R_{I,Right}$.

A normalized X-axis distance NDX represents a normalized distance along the X-axis and is calculated by using the following Equation 1:

$$NDX = \frac{x_P - x_I}{R_I} \qquad \text{Equation 1}$$

where $X_I$, $X_P$, and $R_I$ respectively represent an X-axis component of iris circle center coordinates, an X-axis component of pupil circle center coordinates, and an iris circle radius.

Moreover, a normalized Y-axis distance NDY represents a normalized distance along the Y-axis and is calculated by using the following Equation 2:

$$NDY = \frac{y_P - y_I}{R_I} \qquad \text{Equation 2}$$

where $Y_I$, $Y_P$, and $R_I$ respectively represent a Y-axis component of iris circle center coordinates, a Y-axis component of pupil circle center coordinates, and an iris circle radius.

Furthermore, the circle radius ratio PIR represents a ratio between the iris circle radius $R_I$ and pupil circle radius $R_P$ for the left and right eyes, and is calculated by using the following Equation 3:

$$PIR = \frac{R_P}{R_I} \qquad \text{Equation 3}$$

The processor 201 may obtain a second similarity parameter based on the second iris feature obtained during authentication, i.e., a normalized X-axis distance $NDX_{Left}$ for the left eye, a normalized Y-axis distance $NDY_{Left}$ for the left eye, a left eye circle radius ratio $PIR_{Left}$, a left iris circle radius $R_{I,Left}$, a normalized X-axis distance $NDX_{Right}$ for the right eye, a normalized Y-axis distance $NDY_{Right}$ for the right eye, a right eye circle radius ratio $PIR_{Right}$, and a right eye iris circle radius $R_{I,Right}$.

The second similarity parameter may include, for example, a minimum center distance difference parameter $\Delta ND_{min}$ which indicates a minimum distance between centers of the pupil circle and the iris circle. For example, the processor 201 may obtain the minimum center distance difference parameter $\Delta ND_{min}$ by determining the minimum distance between the centers of the pupil circle and the iris circle.

In addition, the second similarity parameter may include, for example, a maximum center distance difference parameter $\Delta ND_{max}$ which indicates a maximum distance between the centers of the pupil circle and the iris circle. For example, the processor 201 may obtain the maximum center distance difference parameter $\Delta ND_{max}$ by determining the maximum distance between the centers of the pupil circle and the iris circle.

The minimum center distance difference parameter $\Delta ND_{min}$ and maximum center distance difference parameter $\Delta ND_{max}$ are respectively determined as parameters having a minimum distance and a maximum distance from among distance difference parameters $\Delta ND$ calculated by using the following Equation 4:

$$\Delta ND = \sqrt{(NDX_{Probe} - NDX_{Enrolled})^2 + (NDY_{Probe} - NDY_{Enrolled})^2} \qquad \text{Equation 4}$$

Furthermore, the second similarity parameter may include a radius difference average parameter $\Delta R_{I,avg}$ which indicates an average of a normalized left eye iris circle radius difference and a normalized right eye iris circle radius difference.

For example, the processor 201 may obtain the radius difference average parameter $\Delta R_{I,avg}$ by calculating the average of the normalized left eye iris circle radius difference and the normalized right eye iris circle radius difference. For example, the radius difference average parameter $\Delta R_{I,avg}$ may be calculated by using the following Equation 5:

$$\Delta R_{I,avg} = 0.5 \cdot \left( \frac{|R_{I,Left}^{Probe} - R_{I,Left}^{Enrolled}|}{R_{I,Left}^{Probe} + R_{I,Left}^{Enrolled}} + \frac{|R_{I,Right}^{Probe} - R_{I,Right}^{Enrolled}|}{R_{I,Right}^{Probe} + R_{I,Right}^{Enrolled}} \right) \qquad \text{Equation 5}$$

Furthermore, the second similarity parameter may include, for example, a radius ratio difference average parameter $\Delta PIR_{avg}$ that indicates an average of a difference between ratios of a pupil circle radius to an iris circle radius of a left eye and a difference between ratios of a pupil circle radius to an iris circle radius of a right eye.

For example, the processor 201 may obtain the radius ratio difference average parameter $\Delta PIR_{avg}$ by calculating the average of the difference between the ratios of the pupil circle radius to the iris circle radius of the left eye and the difference between the ratios of the pupil circle radius to the iris circle radius of the right eye. For example, the radius ratio difference average parameter $\Delta PIR_{avg}$ may be calculated by using the following Equation 6:

$$\Delta PIR_{avg} = 0.5 \cdot (|PIR_{Left}^{Enrolled} - PIR_{Left}^{Probe}| + |PIR_{Right}^{Enrolled} - PIR_{Right}^{Probe}|) \qquad \text{Equation 6}$$

Referring back to FIG. 6, in operation S603, the processor 201 may calculate a similarity score by using the first and second similarity parameters.

Figure 7:
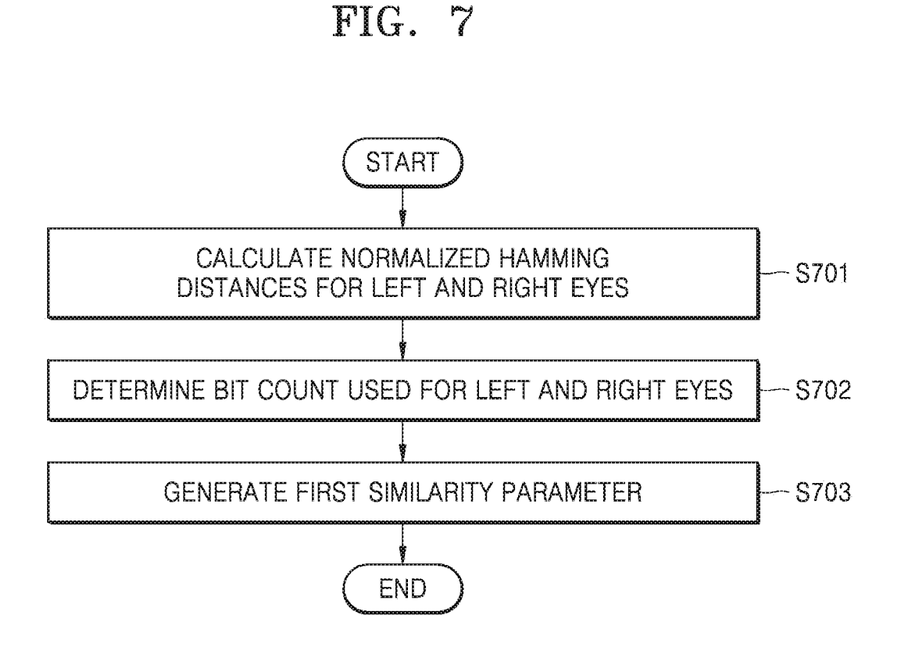
FIG. 7 a flowchart of a method of calculating a first similarity parameter, according to some embodiments.

FIG. 7 is a flowchart of a method of calculating a first similarity parameter, according to some embodiments.

In operation S701, the processor 201 may calculate a normalized Hamming distance $HD_{Left}$ for the left eye and a normalized Hamming distance $HD_{Right}$ for the right eye by comparing an iris code with a reference code.

For example, the processor 201 may calculate the normalized Hamming distances $HD_{Left}$ and $HD_{Right}$ for the left and right eyes by comparing a binary iris code $IrisCode^{Probe}$ obtained from a user's left and right eye image with a reference code $IrisCode^{Enrolled}$ included in prestored reference iris data.

In operation 702, the processor 201 may determine the number of bits $BitCount_{Left}$ for the left eye, which are used to calculate the normalized Hamming distance $HD_{Left}$ for the left eye, and the number of bits $BitCount_{Right}$ for the right eye, which are used to calculate the normalized Hamming distance $HD_{Right}$ for the right eye.

For example, the bits used to calculate each normalized Hamming distance parameter correspond to bits in a part of an iris that is not masked when the user registers an image from which more information is to be obtained during authentication when the user has his or her eyes narrowed.

In operation S703, the processor 201 may generate a first similarity parameter based on the normalized Hamming distances $HD_{Left}$ and $HD_{Right}$ for the left and right eyes and the numbers of bits $BitCount_{Left}$ and $BitCount_{Right}$ for the left and right eyes.

For example, the first similarity parameter may include a Hamming distance difference parameter $\Delta HD_{norm}$ that indicates a normalized difference between the normalized Hamming distances $HD_{Left}$ and $HD_{right}$ for the left and right eyes.

For example, the processor 201 may obtain the Hamming distance difference parameter $\Delta HD_{norm}$ by normalizing a difference between the normalized Hamming distances $HD_{Left}$ and $HD_{right}$ for the left and right eyes. For example, the Hamming distance difference parameter $\Delta HD_{norm}$ may be calculated by using the following Equation 7:

$$\Delta HD_{norm} = \frac{|HD_{Left} - HD_{Right}|}{HD_{Left} + HD_{Right}} \quad \text{Equation 7}$$

Furthermore, the first similarity parameter may include, for example, a Hamming distance average parameter $HD_{avg}$ that indicates an average of the normalized Hamming distances $HD_{Left}$ and $HD_{right}$ for the left and right eyes.

For example, the processor 201 may obtain the Hamming distance average parameter $HD_{avg}$ by calculating the average of the normalized Hamming distances $HD_{Left}$ and $HD_{right}$ for the left and right eyes. For example, the Hamming distance average parameter $HD_{avg}$ may be calculated by using the following Equation 8:

$$HD_{avg} = 0.5 \cdot (HD_{Left} + HD_{Right}) \quad \text{Equation 8}$$

Furthermore, the first similarity parameter may include, for example, a minimum total bit number parameter BitCount$_m$m which indicates a minimum total number of bits used to calculate the normalized Hamming distances $HD_{left}$ and $HD_{right}$ for the left and right eyes.

For example, the processor 201 may obtain the minimum total bit number parameter $BitCount_{min}$ by calculating the minimum total number of bits used to calculate the normalized Hamming distances $HD_{left}$ and $HD_{right}$ for the left and right eyes. For example, the minimum total bit number parameter $BitCount_{min}$ may be calculated by using the following Equation 9:

$$BitCount_{min} = \frac{1}{\text{MAX\_BITS}} \cdot \min(BitCount_{Left}, BitCount_{Right}) \quad \text{Equation 9}$$

Furthermore, the first similarity parameter may include, for example, a maximum total bit number parameter $BitCount_{max}$ which indicates a maximum total number of bits used to calculate the normalized Hamming distances $HD_{left}$ and $HD_{right}$ for the left and right eyes.

For example, the processor 201 may obtain the maximum total bit number parameter $BitCount_{max}$ by calculating the maximum total number of bits used to calculate the normalized Hamming distances $HD_{left}$ and $HD_{right}$ for the left and right eyes. For example, the maximum total bit number parameter $BitCount_{max}$ may be calculated by using the following Equation 10:

$$BitCount_{max} = \frac{1}{\text{MAX\_BITS}} \cdot \max(BitCount_{Left}, BitCount_{Right}) \quad \text{Equation 10}$$

MAX_BTS in Equations (9) and (10) is the maximum number of bits available to represent a binary iris code and may be preset based on experimental data.

Figure 8:
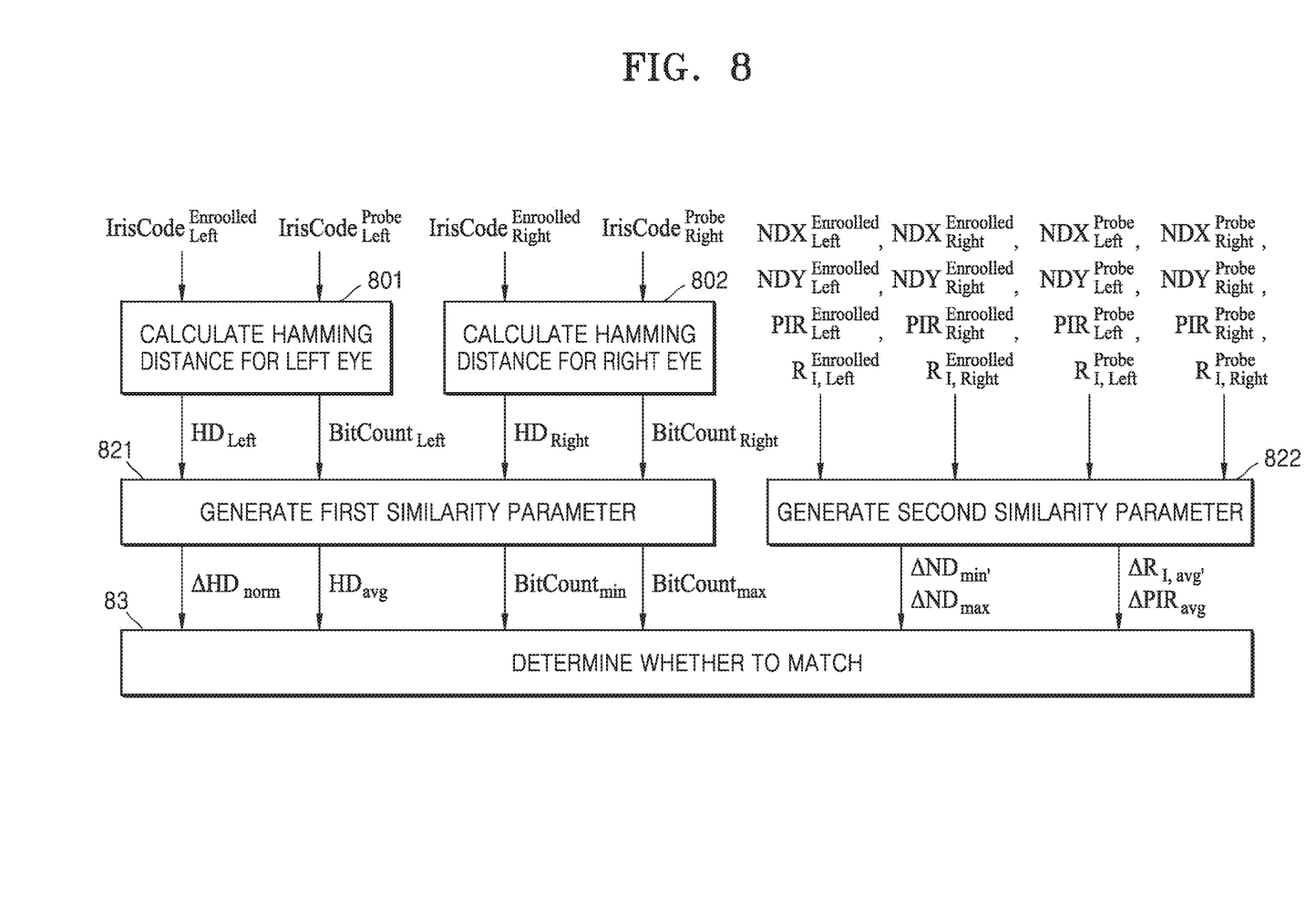
FIG. 8 illustrates a method of calculating a similarity score by using a first similarity parameter and a second similarity parameter.

FIG. 8 illustrates a method of calculating a similarity score by using first and second similarity parameters.

Referring to FIG. 8, the processor 201 may obtain a normalized Hamming distance $HD_{Left}$ for the left eye and the number of bits $BitCount_{Left}$ for the left eye based on a reference left eye iris code $IrisCode_{Left}^{Enrolled}$ included in prestored reference iris data and a left eye iris code obtained from an image of a user's left and right eyes (801).

Furthermore, the processor 201 may obtain a normalized Hamming distance $HD_{Right}$ for the right eye and the number of bits $BitCount_{Right}$ for the right eye based on a reference right eye iris code $IrisCode_{Right}^{Enrolled}$ included in the prestored reference iris data and a right eye iris code obtained from the image of the user's left and right eyes (802).

The processor 201 may generate a first similarity parameter based on the obtained normalized Hamming distances $HD_{Left}$ and $HD_{Right}$ for the left and right eyes and numbers of bits $BitCount_{Left}$ and $BitCount_{Right}$ for the left and right eyes (821).

For example, the first similarity parameter may include a Hamming distance difference parameter $\Delta HD_{norm}$ indicating a normalized difference between the normalized Hamming distances $HD_{Left}$ and $HD_{right}$ for the left and right eyes, a Hamming distance average parameter $HD_{avg}$ indicating an average of the normalized Hamming distances $HD_{Left}$ and $HD_{right}$, a minimum total bit number parameter $BitCount_{min}$ indicating a minimum total number of bits used to calculate the normalized Hamming distances $HD_{Left}$ and $HD_{right}$, and a maximum total bit number parameter $BitCount_{max}$ indicating a maximum total number of bits used to calculate the normalized Hamming distances $HD_{left}$ and $HD_{right}$.

In addition, the processor 201 may generate a second similarity parameter by comparing a second iris feature obtained from the image of the user's left and right eyes with a reference feature included in the prestored reference iris data.

In order to generate the second similarity parameter, the processor 201 may use a reference left eye feature included in the prestored reference iris data, such as a reference normalized X-axis distance parameter $NDX_{Left}^{Enrolled}$ for the left eye, a reference normalized Y-axis distance parameter $NDY_{Left}^{Enrolled}$ for the left eye, a reference circle radius ratio parameter $PIR_{Left}^{Enrolled}$, and a reference iris circle radius parameter $R_{I,Left}^{Enrolled}$, and a reference right eye feature such as a reference normalized X-axis distance parameter $NDX_{Right}^{Enrolled}$ for the right eye, a reference normalized Y-axis distance parameter $NDY_{Right}^{Enrolled}$ for the right eye, a reference circle radius ratio parameter $PIR_{Right}^{Enrolled}$, and a reference iris circle radius parameter $R_{I,Right}^{Enrolled}$ (822).

Furthermore, to generate the second similarity parameter, the processor 201 may use a second left eye iris feature obtained from the image of the user's left and right eyes, such as a normalized X-axis distance parameter $NDX_{Left}^{Enrolled}$ for the left eye, a normalized Y-axis distance parameter $NDY_{Left}^{Enrolled}$ for the left eye, a circle radius ratio parameter $PIR_{Left}^{Enrolled}$, and an iris circle radius parameter $R_{I,Left}^{Enrolled}$, and a second right eye iris feature such as a normalized X-axis distance parameter $NDX_{Right}^{Enrolled}$ for the right eye, a normalized Y-axis distance parameter $NDY_{Right}^{Enrolled}$ for the right eye, a circle radius ratio parameter $PIR_{Right}^{Enrolled}$, and an iris circle radius parameter $R_{I,Right}^{Enrolled}$ (822).

For example, the second similarity parameter may include a minimum center distance difference parameter $\Delta ND_{min}$ indicating a minimum distance between centers of the pupil circle and the iris circle, a maximum center distance difference parameter $\Delta ND_{max}$ indicating a maximum distance between the centers of the pupil circle and the iris circle, a radius difference average parameter $\Delta R_{I,avg}$ indicating an average of a normalized left eye iris circle radius difference and a normalized right eye iris circle radius difference, and a radius ratio difference average parameter $\Delta PIR_{avg}$ indicating an average of a difference between ratios of a pupil circle radius to an iris circle radius of a left eye and a difference between ratios of a pupil circle radius to an iris circle radius of a right eye.

The processor 201 may calculate a similarity score based on the generated first and second similarity parameters. For example, the similarity score may be calculated by using the following Equation 11 containing both the first and second similarity parameters.

$$S = \frac{1}{(1 + \exp(-ic - w_1 \cdot \Delta HD_{norm} - w_2 \cdot HD_{avg} - w_3 \cdot BitCount_{min} - w_4 \cdot BitCount_{max} - w_5 \cdot \Delta ND_{min} - w_6 \cdot \Delta ND_{max} - w_7 \cdot \Delta PIR_{avg} - w_8 \cdot \Delta R_{I,avg}))} \quad \text{Equation 11}$$

where S is a similarity score, ic is a bias factor, and $w_i$ ($w_1$ through $w_8$) is a weighting factor. For example, the bias factor ic and the weighting factor $w_i$ may be obtained empirically by using a logistic regression model for a training data set including a plurality of iris images of a user and may be predetermined based on experimental data acquired at different distances from the user and under different capture conditions.

Figure 9:
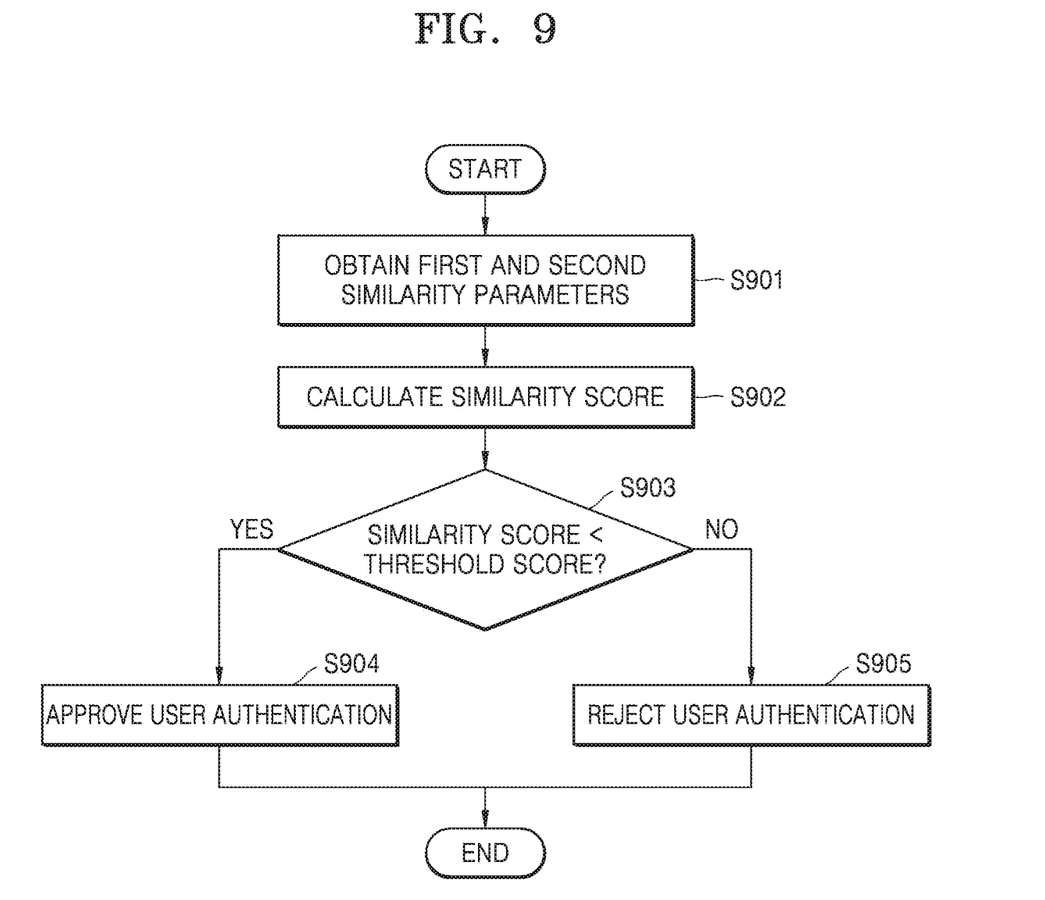
FIG. 9 is a flowchart of a method of determining whether to approve user by comparing a similarity score with a threshold score, according to some embodiments.

FIG. 9 is a flowchart of a method of determining whether to approve user authentication by comparing a similarity score with a threshold score, according to some embodiments.

In operation S901, the processor 201 may obtain first and second similarity parameters, and in operation S902, the processor 201 may calculate a similarity score by using the first and second similarity parameters.

In operation S903, the processor 201 may compare the calculated similarity score with a preset threshold score. For example, the threshold score may be preset based on experimental data acquired for a previously performed test.

As a result of the comparison, when the calculated similarity score is less than the preset threshold score, the processor 201 may approve user authentication in operation S904.

For example, when the calculated similarity score is less than the preset threshold score, the processor 201 may determine that an iris included in prestored reference iris data is the same as an iris obtained from an image of left and right eyes and approve user authentication.

On the other hand, when the calculated similarity score is greater than or equal to the preset threshold score, the processor 201 may reject the user authentication in operation S905.

For example, when the calculated similarity score is greater than or equal to the preset threshold score, the processor 201 may determine that an iris included in the prestored reference iris data is different from an iris obtained from an image of the left and right eyes and reject the user authentication.

To determine the accuracy of a user authentication method according to the present disclosure, a series of tests were conducted with respect to the proposed method of authenticating a user with his or her eyes covered, and in particular, a test was conducted on users who did not wear glasses in an indoor space.

For comparison with the proposed method, an authentication method using a consensus rule and an authentication method using a minimum HD value selection rule were additionally performed.

A condition for approving user authentication in the authentication method using the consensus rule is that a Hamming distance $HD_{Left}$ for the left eye is less than a preset threshold and a Hamming distance $HD_{Right}$ for the right eye is less than a preset threshold.

On the other hand, a condition for approving user authentication in the authentication method using the minimum HD value selection rule is to satisfy that a minimum value of the Hamming distances $HD_{Left}$ and $HD_{Right}$ for the left and right eyes is determined as a similarity score and that the determined similarity score is less than the preset threshold.

A quantitative ratio (FNMR at FMR≈$10^{-7}$,%) between percentages of authentication errors, i.e., a False Non-Match Rate (FNMR) at which a user is incorrectly recognized as a different person and a False Match Rate (FMR) at which a person other than the user is falsely recognized as the user was calculated for each authentication method.

According to the conducted tests, the percentage of authentication errors recorded when using the authentication method based on the consensus rule is 3.59% higher than a result obtained by applying the authentication method of the present disclosure.

Moreover, the percentage of authentication errors recorded when using the authentication method based on the minimum HD value selection rule is 3.13% higher than a result obtained by applying the authentication method of the present disclosure.

Thus, the authentication method of the present disclosure provides more accurate results than the authentication method using the consensus rule and the authentication method using the minimum HD value selection rule without significantly increasing the required computational resources.

Those of ordinary skill in the art will appreciate that the number of structural elements or components of a device may vary when necessary. In addition, those of ordinary skill in the art should understand that arrangement of blocks of the device presented herein is merely an example and may be modified as needed to achieve greater efficiency in a specific application unless there is a particular description contrary thereto. The expression of an element of a system in singular form does not exclude a plurality of elements, unless clearly indicated otherwise.

Although exemplary embodiments of the present disclosure have been described in the present specification, it should be understood that various changes and modifications may be made without departing from the scope of protection of the disclosure as defined by the appended claims.

The invention claimed is:

1. A method of authenticating a user based on iris recognition, the method comprising:
   acquiring an image of a user's left and right eyes;
   extracting a pupil image and an iris image from the image;
   obtaining a first iris feature by analyzing the iris image;
   obtaining a second iris feature by analyzing the iris image and the pupil image;
   obtaining a similarity score based on the first iris feature, the second iris feature, and prestored reference iris data; and
   determining whether to approve user authentication based on the similarity score,
   wherein the obtaining of the similarity score comprises:
       generating a first similarity parameter by comparing an iris code corresponding to the first iris feature with a reference code included in the prestored reference iris data;

generating a second similarity parameter by comparing the second iris feature with a reference feature included in the prestored reference iris data; and obtaining the similarity score by using the first similarity parameter and the second similarity parameter, and wherein the second similarity parameter is generated based on a radius $R_I$ of an iris circle for the left and right eyes, a ratio PIR between a radius of a pupil circle and the radius $R_I$ of the iris circle for the left and right eyes, a normalized X-axis distance NDX for the left and right eyes, and a normalized Y-axis distance NDY for the left and right eyes.

2. The method of claim 1, wherein the generating of the first similarity parameter comprises:

calculating a normalized Hamming distance $HD_{Left}$ for the left eye and a normalized Hamming distance $HD_{Right}$ for the right eye by comparing the iris code with the reference code;

determining a bit number $BitCount_{Left}$ for the left eye used to calculate the normalized Hamming distance $HD_{Left}$ for the left eye and a bit number $BitCount_{Right}$ for the right eye used to calculate the normalized Hamming distance $HD_{Left}$ for the right eye; and generating the first similarity parameter based on the normalized Hamming distance $HD_{Left}$ for the left eye, the normalized Hamming distance $HD_{Right}$ for the right eye, the bit number $BitCount_{Left}$ for the left eye, and the bit number $BitCount_{Right}$ for the right eye.

3. The method of claim 2, wherein the first similarity parameter comprises a Hamming distance difference parameter $\Delta HD_{norm}$ indicating a normalized difference between the normalized Hamming distances $HD_{Left}$ and $HD_{right}$ for the left and right eyes.

4. The method of claim 2, wherein the first similarity parameter comprises a Hamming distance average parameter $HD_{avg}$ indicating an average of the normalized Hamming distances $HD_{Left}$ and $HD_{right}$ for the left and right eyes.

5. The method of claim 2, wherein the first similarity parameter comprises a minimum total bit number parameter $BitCount_{min}$ indicating a minimum total number of bits used to calculate the normalized hamming distances $HD_{left}$ and $HD_{right}$ for the left and right eyes.

6. The method of claim 2, wherein the first similarity parameter comprises a maximum total bit number parameter $BitCount_{max}$ indicating a maximum total number of bits used to calculate the normalized Hamming distances $HD_{left}$ and $HD_{right}$ for the left and right eyes.

7. The method of claim 1, wherein the second similarity parameter comprises a minimum center distance difference parameter $\Delta ND_{min}$ indicating a minimum distance between centers of the pupil circle and the iris circle.

8. The method of claim 1, wherein the second similarity parameter comprises a maximum center distance difference parameter $\Delta ND_{max}$ indicating a maximum distance between centers of the pupil circle and the iris circle.

9. The method of claim 7, wherein the second similarity parameter comprises a radius difference average parameter $\Delta R_{I,avg}$ indicating an average of a normalized left eye iris circle radius difference and a normalized right eye iris circle radius difference.

10. The method of claim 7, wherein the second similarity parameter comprises a radius ratio difference average parameter $\Delta PIR_{avg}$ indicating an average of a difference between ratios of pupil circle radius to an iris circle radius of a left eye and a difference between ratios of a pupil circle radius to an iris circle radius of a right eye.

11. The method of claim 1, wherein the similarity score is calculated by using the following Equation:

$$S = \frac{1}{(1 + \exp(-ic - w_1 \cdot \Delta HD_{norm} - w_2 \cdot HD_{avg} - w_3 \cdot BitCount_{min} - w_4 \cdot BitCount_{max} - w_5 \cdot \Delta ND_{min} - w_6 \cdot \Delta ND_{max} - w_7 \cdot \Delta PIR_{avg} - w_8 \cdot \Delta R_{I,avg}))}$$

wherein S is a similarity score, $\Delta HD_{norm}$ represents a normalized difference between normalized Hamming distances $HD_{Left}$ and $HD_{right}$ for the left and right eyes, $HD_{avg}$ represents an average of the normalized Hamming distances $HD_{Left}$ and $HD_{right}$ for the left and right eyes, $BitCount_{min}$ and $BitCount_{max}$ respectively represent a minimum total number of bits and a maximum total number of bits used to calculate the normalized Hamming distances $HD_{left}$ and $HD_{right}$ for the left and right eyes, $\Delta ND_{min}$ and $\Delta ND_{max}$ respectively represent a minimum distance and a maximum distance between centers of a pupil circle and an iris circle, $\Delta PIR_{avg}$ represents an average of a difference between ratios of a pupil circle radius to an iris circle radius of the left eye and a difference between ratios of a pupil circle radius to an iris circle radius of the right eye, $\Delta R_{I,avg}$ represents an average of a normalized left eye iris circle radius difference and a normalized right eye iris circle radius difference, ic is a bias factor, and $w_i$ is a weighting factor.

12. A device for authenticating a user based on iris recognition, the device comprising:

at least one processor configured to:
acquire an image of a user's left and right eyes,
extract a pupil image and an iris image from the image,
obtain a first iris feature by analyzing the iris image,
obtain a second iris feature by analyzing the iris image and the pupil image,
obtain a similarity score based on the first iris feature, the second iris feature, and prestored reference iris data, and
determine whether to approve user authentication based on the similarity score; and at least one memory storing the reference iris data,
wherein the obtaining of the similarity score comprises:
generating a first similarity parameter by comparing an iris code corresponding to the first iris feature with a reference code included in the prestored reference iris data;

generating a second similarity parameter by comparing the second iris feature with a reference feature included in the prestored reference iris data; and obtaining the similarity score by using the first similarity parameter and the second similarity parameter, and wherein the second similarity parameter is generated based on a radius $R_I$ of an iris circle for the left and right eyes, a ratio PIR between a radius of a pupil circle and the radius $R_I$ of the iris circle for the left and right eyes, a normalized X-axis distance NDX for the left and right eyes, and a normalized Y-axis distance NDY for the left and right eyes.

13. A non-transitory computer program product comprising a computer-readable recording medium having recorded thereon a program for executing the method of claim 1 on a computer.

14. A method of authenticating a user based on iris recognition, the method comprising:
- acquiring an image of a user's left and right eyes;
- extracting a pupil image and an iris image from the image;
- obtaining a first iris feature by analyzing the iris image;
- obtaining a second iris feature by analyzing the iris image and the pupil image;
- obtaining a similarity score based on the first iris feature, the second iris feature, and prestored reference iris data; and
- determining whether to approve user authentication based on the similarity score,
- wherein the obtaining of the similarity score comprises:
  - generating a first similarity parameter by comparing an iris code corresponding to the first iris feature with a reference code included in the prestored reference iris data;
  - generating a second similarity parameter by comparing the second iris feature with a reference feature included in the prestored reference iris data; and
  - obtaining the similarity score by using the first similarity parameter and the second similarity parameter, and
- wherein the generating of the first similarity parameter comprises:
  - calculating a normalized Hamming distance $HD_{Left}$ for the left eye and a normalized Hamming distance $HD_{Right}$ for the right eye by comparing the iris code with the reference code;
  - determining a bit number $BitCount_{Left}$ for the left eye used to calculate the normalized Hamming distance $HD_{Left}$ for the left eye and a bit number $BitCount_{Right}$ for the right eye used to calculate the normalized Hamming distance $HD_{Left}$ for the right eye; and
  - generating the first similarity parameter based on the normalized Hamming distance $HD_{Left}$ for the left eye, the normalized Hamming distance $HD_{Right}$ for the right eye, the bit number $BitCount_{Left}$ for the left eye, and the bit number $BitCount_{Right}$ for the right eye.

15. The method of claim 14, wherein the first similarity parameter comprises a Hamming distance difference parameter $\Delta HD_{norm}$ indicating a normalized difference between the normalized Hamming distances $HD_{Left}$ and $HD_{right}$ for the left and right eyes.

16. The method of claim 14, wherein the first similarity parameter comprises a Hamming distance average parameter $HD_{avg}$ indicating an average of the normalized Hamming distances $HD_{Left}$ and $HD_{right}$ for the left and right eyes.

17. The method of claim 14, wherein the first similarity parameter comprises a minimum total bit number parameter $BitCount_{min}$ indicating a minimum total number of bits used to calculate the normalized Hamming distances $HD_{left}$ and $HD_{right}$ for the left and right eyes.

18. The method of claim 15, wherein the first similarity parameter comprises a maximum total bit number parameter $BitCount_{max}$ indicating a maximum total number of bits used to calculate the normalized Hamming distances $HD_{left}$ and $HD_{right}$ for the left and right eyes.

* * * * *